United States Patent [19]

Tuschner et al.

[11] 4,028,324

[45] June 7, 1977

[54] HIGH TEMPERATURE SEAL MATERIAL AND METHOD FOR MANUFACTURING THE SAME

[75] Inventors: Jerome G. Tuschner, Enfield; Richard C. Nickols, Jr., Glastonbury, both of Conn.

[73] Assignee: United Technologies Corporation, Hartford, Conn.

[22] Filed: Dec. 16, 1975

[21] Appl. No.: 641,204

[52] U.S. Cl. .............................. 260/33.8 F; 252/58
[51] Int. Cl.² .................... C08K 5/02; C10M 5/18; C10M 7/28
[58] Field of Search ................ 260/33.8 F; 526/18, 526/255; 264/154, DIG. 47; 252/58

[56] References Cited

UNITED STATES PATENTS

| | | | |
|---|---|---|---|
| 2,685,707 | 8/1954 | Llewellyn et al. | 526/18 |
| 2,706,715 | 4/1955 | Conner | 252/58 |
| 3,000,846 | 9/1961 | Runton et al. | 260/42.27 |
| 3,314,889 | 4/1967 | Christian | 252/58 |
| 3,434,996 | 3/1969 | Salatiello et al. | 260/33.8 F |
| 3,445,393 | 5/1969 | Hinds | 252/58 |
| 3,480,547 | 11/1969 | Van Dyk | 428/422 |
| 3,493,513 | 2/1970 | Petriello | 252/58 |
| 3,630,901 | 12/1971 | Messina et al. | 252/58 |
| 3,632,788 | 1/1972 | Stivers et al. | 260/30.6 R |
| 3,639,237 | 2/1972 | Curtis | 252/58 |
| 3,640,859 | 2/1972 | Messina et al. | 252/58 |
| 3,682,859 | 8/1972 | Taylor et al. | 260/33.8 F |
| 3,784,471 | 1/1974 | Kaiser | 252/58 |

OTHER PUBLICATIONS

Encyclopedia of Pol. Sci. & Techn. (vol. 13)(Interscience)(N.Y.) (1970), pp. 631–632, 636–637, & 646–647.
Modern Plastics Encyclopedia 1968 (McGraw-Hill) (New York), (Sept. 1967), p. 579.

*Primary Examiner*—Donald E. Czaja
*Assistant Examiner*—H. H. Fletcher
*Attorney, Agent, or Firm*—Stephen E. Revis

[57] ABSTRACT

An extruded seal material which is stable in phosphoric acid is composed of fibrillating polytetrafluoroethylene, a halogenated oil, and a filler. Preferably the oil is a fluorocarbon oil and the filler is either non-fibrillating polytetrafluoroethylene, silicon carbide or graphite, all of which are stable in phosphoric acid at temperatures up to at least 400° F. This seal material is particularly suited for use in the environment of a phosphoric acid fuel cell.

8 Claims, No Drawings

HIGH TEMPERATURE SEAL MATERIAL AND METHOD FOR MANUFACTURING THE SAME

BACKGROUND OF THE INVENTION

1. Field of the Invention

The present invention relates to a fluoropolymer seal material and method for making the same.

2. Description of the Prior Art

A phosphoric acid fuel cell stack is formed from a plurality of generally flat rectangular shaped fuel cells stacked one upon another. The cells use phosphoric acid as the electrolyte and may reach temperatures of 400° F. The fuel or oxidant may be fed into each of the cells in the stack through openings in the sides of the stack by means of a manifold which covers at least a portion of the side of the stack and which must be sealed around the edge thereof against the surface of the stack to prevent leaking of the reactant gas. The surface of the stack against which the manifold must be sealed may have discontinuities of up to 0.050 inch due to tolerances resulting from the manufacture of the individual components in the stack and tolerances resulting from the assembly of the components.

From the foregoing, it is apparent that a seal material for this application must be compatible with phosphoric acid, be conformable to relatively large stack surface discontinuities, and have structural integrity, all at temperatures up to 400° F and for the life of the stack, which is desirably at least 40,000 hours. Also, the structural integrity or sealing ability must be maintained through numerous temperature cycles. Due to structural limitations of the stack and a desire to minimize the size, complexity and cost of stack hardware, it is also highly desirable that the seal material be able to effect a seal with low compressive forces.

No seal material on the market has been found to be suitable for this particular application. Elastomers such as ethylenepropylene rubber are suitable for temperatures below 325° F; however, at temperatures over 325° F they are corroded by phosphoric acid to an unacceptable extent and they have been found to lose their elastomeric properties due to air oxidation at these higher temperatures. Polytetrafluoroethylene rope type seal material presently on the market, such as Ready Seal by Chemplast, Inc., Wayne, New Jersey, is very stiff. For example, it was attempted to use this material as the manifold sealant in the aforementioned fuel cell application, but a satisfactory seal could not be effected even with pressures between 450-500 psi. Grease compositions made with an oil base thickened with nonfibrillating PTFE, such as described in U.S. Pat. No. 3,493,513, do not have sufficient strength to maintain the seal integrity at high temperatures and throughout temperature cylces since the oil volatizes and weeps out, resulting in a drying out and cracking of this type of seal material.

SUMMARY OF THE INVENTION

Accordingly, the present invention is an extruded seal material the composition of which consists essentially of fibrillating polytetrafluoroethylene, a halogenated oil, 0-5% by weight of a halogenated solvent, and a filler stable in phosphoric acid and compatible with polytetrafluoroethylene. The present invention also includes methods for manufacturing the seal material.

In a more particular embodiment of the present invention the seal material consists essentially of 10-40% by weight fibrillating polytetrafluoroethylene, 0-5% by weight halogenated solvent, 30-50% by weight halogenated oil, the oil being stable in phosphoric acid up to at least 400° F, having a low volatility at temperatures up to at least 400° F, and being a liquid at room temperatures through at least 400° F, the balance of the seal material being a filler material selected from the group consisting of non-fibrillating polytetrafluoroethylene, silicon carbide, and graphite, or combinations thereof.

In the method for making a seal material according to the present invention a halogenated oil dissolved in a halogenated solvent, fibrillating polytetrafluoroethylene, and a suitable filler are blended together in a manner so as not to cause substantial fibrillation of the polytetrafluoroethylene. The solvent is driven off so that no more than 5% by weight of the remaining mixture is solvent, and the mixture is then extruded in a ram extruder.

Preferably, in the foregoing method, of the ingredients blended together 10-40 parts by weight are fibrillating polytetrafluoroethylene, 30-50 parts by weight are halogenated oil, the oil having been dissolved in a halogenated solvent and having the characteristics that at temperatures up to at least 400° F it is stable in phosporic acid and has a low volatility, and it is a liquid at room temperatures through at least 400° F, the blance being filler which is stable in phosphoric acid up to at least 400° F and compatible with polytetrafluoroethylene.

The foregoing and other objects, features, and advantages of the present invention will become more apparent in the light of the following detailed description of preferred embodiments thereof.

DESCRIPTION OF THE PREFERRED EMBODIMENTS

EXAMPLE I

A seal material according to the present invention was made by stirring together 800 grams of Dupont's Krytox 143AE fluorocarbon oil and 800 grams of Dupont's Freon 113 solvent until homogeneous solution was obtained. Freon 113 is generically defined as trichlorotrifluoroethylene. This solution was placed in a sigma blade Laboratory Mixer manufactured by Baker Perkins, Inc., Saginaw, Michigan, (Model No. 4AN-2). To this solution was added 600 grams of Polymist F-5 non-fibrillating polytetrafluoroethylene (hereinafter PTFE) powder from Davis Nitrate, Metuchen, New Jersey. These ingredients were blended in the Laboratory Mixer for approximately one minute. Six hundred grams of Dupont's TFE 6A fibrillating PTFE powder was then added to the mixture and blended in the mixer for approximately 15 seconds. The mixture was then placed on a large shallow tray to allow the Freon 113 to evaporate. Evaporation can occur at room temperature, however, heating to 200° F or less facilitates drying. After evaporation of the solvent the ram cavity of a ram extruder was filled with the mixture. The mixture was then pressed through the die of the ram extruder to form a rope-like seal material. As herein used, "rope-like" is not intended to be limited to circular cross sections, but may be rectangular, oval, or other extrudable shape.

Note, in Example I, that the fibrillating PTFE is mixed with the other ingredients for only 15 seconds. This is to minimize the amount of fibrillation prior to extrusion since the shear forces created by the mixer cause fibrillation. Fibrillation during the mixing process results in randomly oriented fibrils which, if substantial, will result in the seal material not extruding uniformly. It is instead desired that the fibrillation take place during the extrusion process. The fibrils formed during extrusion align themselves substantially along the axis of the "rope", and the result is more uniform dimensional and physical properties. Along these same lines, precautions must be taken in handling the material as it is placed in the ram extruder since the application of excessive force during this process can also cause premature fibrillation and additional random fibril orientation prior to extrusion.

Basically, the diameter of the rope of seal material is determined by the size of the die used in the extruder; however, uniformity is effected by the amount of pressure applied as well as the closure speed of the ram. It is contemplated that the rope diameter may have to be monitored and the ram speed and applied pressure varied as necessary to maintain the diameter within close specification limits.

A 150 mil diameter rope was made according to Example I using an extruder having a die opening diameter of 78 mils. Extrusion pressure was maintained at approximately 2000 psi and an extrusion rate of four feet per minute was used. The rope diameter did not vary by more than 10 mils. This seal material was used between a phosphoric acid fuel cell stack and the reactant gas manifold used to feed fuel to the stack. It effected a satisfactory seal with a compressive force of from 50–150 psi at temperatures up to 400° F. Gaps of up to 0.05 inch between the edge of the manifold and the stack did not present a problem. It was run in this environment for approximately 2000 hours without showing signs of any significant deterioration.

EXAMPLE II

Another seal material according to the present invention was made by mixing 30 parts by weight of Polymist F-5 non-fibrillating PTFE powder with 30 parts weight of Allied Chemical's G-700 fibrillating PTFE powder. This mixture was then added to 40 parts by weight of Dupont's Krytox 143AE fluorocarbon oil dissolved in 40 parts Dupont's Freon 113 solvent. These ingredients were mixed together for 10 seconds, which was sufficiently long to assure that the oil was well dispersed throughout the mixture, but was short enough to preclude substantial fibrillation. In this regard the solvent reduces the amount of fibrillation, which is its main function. The remaining steps are the same as in Example I, including driving off the solvent, placing in a ram extruder, and extruding the seal material. The physical properties of this seal material were comparable to those of Example I.

In Example I it is difficult to uniformly disperse the fibrillating and non-fibrillating PTFE throughout the seal material because the mixing time must be limited and carefully controlled to prevent substantial fibrillation prior to extrusion. In the method of Example II the fibrillating and non-fibrillating PTFE are thoroughly mixed together as dry powders. No fibrillation takes place during this step, and the result is an easily obtained uniform distribution of these powders throughout the seal material. The method of Example II is therefore preferred over the method of Example I.

EXAMPLE III

A seal material was made according to the method of Example II by combining 45 parts Polymist F-5 non-fibrillating PTFE powder, 15 parts Dupont's TFE 6A fibrillating PTFE powder, and 40 parts Krytox 143AE oil dissolved in 40 parts Freon 113. The resulting seal material was generally satisfactory, but it was softer than the seal materials of Examples I and II and did not last as long.

EXAMPLE IV

A seal material was made according to the method of Example II by combining 30 parts Polymist F-5 non-fibrillating PTFE powder, 25 parts Dupont's TFE 6A fibrillating PTFE powder, and 45 parts Krytox 143AE oil dissolved in 45 parts Freon 113. This seal material was comparable to the seal material obtained in Example III.

EXAMPLE V

A seal material was made in a manner and with ingredients identical to that of Example III except that immediately prior to extruding the seal material, but after the Freon 113 was evaporated, 5 parts of a Halocarbon oil was added as a solvent to the mixture to determine its effect on the finished product. Halocarbon is a trademark of Halocarbon Products Corporation, Hackensack, New Jersey. The Halocarbon oil used in this example had a generic name of polychlorotrifluoroethylene with the number of repeating units of the polymer being 4 to 11. The addition of this solvent reduced the pressures required to extrude the seal material by a factor of two. The resulting seal material was tested in the manner of the seal material of Example I. Although initially satisfactory it deteriorated faster than the seal material of Example III.

EXAMPLE VI

A seal material was made according to the method of Example I by combining 23 grams Polymist F-5 non-fibrillating PTFE powder, 30 grams Dupont's TFE 6A fibrillating PTFE powder, and 47 grams Dupont's Krytox 240AE grease composition dissolved in 40 grams Freon 113. Dupont's Krytox 240AE grease composition is comprised of 85% Krytox 143AE oil and 15% non-fibrillating PTFE. The seal material produced by this example was tested and found to be satisfactory in all respects, however, it is more expensive than any of the seal materials of the foregoing examples.

EXAMPLE VII

A seal material was made according to the method of Example II by combining 40 parts Polymist F-5 non-fibrillating PTFE powder, 30 parts Dupont's TFE 6A fibrillating PTFE powder, and 30 parts Krytox 143AE fluorocarbon oil dissolved in 30 parts Freon 113. The seal material produced by this example required 375 psi sealing pressure to effect a seal in tests similar to those conducted for the seal material of Example I. Although this pressure was unacceptable for that particular application, the seal material was satisfactory in all other respects and might be suitable for other applications wherein sealing pressures of up to 375 psi can be tolerated. Note that the PTFE Ready Seal discussed in the "Background of the Invention" could not effect a satisfactory seal even with pressures up to 500 psi. It is felt that the higher sealing pressure required for the seal material of this example is due to the smaller amount of oil used as compared to the foregoing examples.

EXAMPLE VIII

A seal material was made according to the method of Example II by combining 30 parts Dupont's TFE 6A fibrillating PTFE powder, 30 parts 600 mesh silicon carbide powder from Carborundum Corporation, Niagara Falls, New York, and 40 parts Krytox 143AE fluorocarbon oil dissolved in 40 parts Freon 113. The seal material made according to this example was satisfactory and had properties similar to the seal materials of Examples I and II.

EXAMPLE IX

A seal material was made in the manner of and using the same ingredients in the same amounts as in Example II, except instead of Krytox 143AE oil, a Halocarbon oil was used. This oil was generically defined as polychlorotrifluoroethylene with the number of repeating units of the polymer being 14 to 25. The seal material worked well initially, but failed after about 200 hours due to excessive volatilization of the oil. A higher molecular weight halogenated oil may have resulted in a better performing seal material.

In general according to the present invention, the halogenated oil used in the seal material can be any oil compatible with PTFE and stable in phosphoric acid and air at temperatures up to at least 400° F. Fluorocarbon oils best satisfy these criteria and are therefore preferred. The oil keeps the seal material soft so that high compressive forces are not needed to effect a seal. It is believed that the seal material should include at least 30 but no more than 50% by weight oil to start with. Larger amounts would reduce the overall strength and life of the seal material, probably due to reduced fibrillation as a result of the excess oil; smaller percentages will yield seals which are too stiff and would require unacceptably high sealing pressures. Along these same lines, the oil should have low volatility at the temperatures to which it is to be subjected so that the seal material will not dry out and lose its sealing ability during use. Low volatility is defined herein as loss of less than 25% of the oil content of the as-prepared seal material due to volatilization at seal operating temperatures up to at least 400° F. It is also preferred that the oil should be a liquid throughout the temperature ranges to which the seal material is to be subjected in order to minimize shrinkage. For example, if the oil is a wax at low temperatures, temperature cycling fo the seal material during use is likely to result in shrinkage due to phase transition, with a possible loss of sealing.

A small amount of the solvent (i.e., less than 5% of the total weight of the mixture) may remain in the mixture prior to extrusion, however, the presence of the solvent reduces the amount of fibrillation during the extrusion process. If in excess of 5% of the extended mixture is solvent, the reduction in the amount of fibrillation will probably reduce the strength and life of the finished product to an unacceptable extent. For this reason it is preferred that essentially no solvent be present in the finished product.

The fibrils of PTFE gives the seal material structural integrity in order that it can withstand the applied shear stresses and not run out from between the sealing surfaces during use. At least 10% by weight fibrillating PTFE is required. However, no more than 40% should be used since greater amounts will increase the stiffness of the material such that unacceptably high sealing pressures are likely to be required.

As used throughout the specification and appended claims, the term "fibrillating polytetrafluoroethylene" is defined as the type of PTFE which fibrillates when subjected to shear stresses, including its "not yet fibrillated" state as well as its "after fibrillated" state, the "after fibrillated" state including fibrils PTFE as well as that portion which did not fibrillate.

The filler material may be any particulate material (or combination of materials) which is stable in phosphoric acid at temperatures up to at least 400° F, which does not corrode in air up to at least 400° F, and which is compatible with PTFE. A preferred material is non-fibrillating PTFE. Another possible filler is silicon carbide. If an electrically conductive seal material is acceptable, which it is not for the particular fuel cell application discussed in the "Background of the Invention", graphite may be used as the filler material.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. An extruded seal material which, before use, consists essentially of:
   a. 10–40% by weight fibrillating polytetrafluoroethylene;
   b. 30–50% by weight halogenated oil having the characteristics that it is stable in phosphoric acid up to at least 400° F, has a low volatility up to at least 400° F, and is a liquid at room temperature through at least 400° F;
   c. 0–5% by weight halogenated solvent; and
   d. a balance of particulate filler material selected from the group consisting of non-fibrillating polytetrafluoroethylene, silicon carbide, and graphite, or combination thereof;
   wherein said seal material is rope like in form, and the fibrils of polytetrafluoroethylene are substantially aligned in the direction of the axis of the rope.

2. The seal material according to claim 1 wherein said halogenated oil is a fluorocarbon oil.

3. The seal material according to claim 1 wherein said filler is non-fibrillating polytetrafluoroethylene.

4. The seal material according to claim 1 wherein said filler is silicon carbide.

5. The seal material according to claim 1 wherein said filler is graphite.

6. The seal material according to claim 1 wherein said seal material includes essentially no solvent.

7. An extruded seal material which, before use, consists essentially of:
   a. 10–40% by weight fibrillating polytetrafluoroethylene;
   b. 30–50% by weight fluorocarbon oil having the characteristics that it is stable in phosphoric acid up to at least 400° F, has a low volatility up to at least 400° F, and is a liquid at room temperatures through at least 400° F;
   c. 0–5% by weight fluorocarbon solvent; and
   d. a balance of non-fibrillating polytetrafluoroethylene powder wherein said seal material is rope like in form, and the fibrils of polytetrafluoroethylene are substantially aligned in the direction of the axis of the rope.

8. The seal material according to claim 7 wherein said seal material includes essentially no solvent.

* * * * *

UNITED STATES PATENT OFFICE
CERTIFICATE OF CORRECTION

PATENT NO. : 4,028,324
DATED : 6/7/77
INVENTOR(S) : Tuschner et al

It is certified that error appears in the above-identified patent and that said Letters Patent are hereby corrected as shown below:

Column 5, line 49: "fo" should read --of--.

Column 5, lines 55-56: "extended" should read --extruded--.

Signed and Sealed this

Twentieth Day of September 1977

[SEAL]

Attest:

RUTH C. MASON
Attesting Officer

LUTRELLE F. PARKER
Acting Commissioner of Patents and Trademarks